(12) United States Patent
Powers

(10) Patent No.: US 7,525,961 B2
(45) Date of Patent: Apr. 28, 2009

(54) AUTO-ADAPTATION TO PACKET SIZE ON A PHYSICAL MEDIUM

(75) Inventor: Randall L. Powers, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 1033 days.

(21) Appl. No.: 10/756,899

(22) Filed: Jan. 14, 2004

(65) Prior Publication Data

US 2005/0152356 A1    Jul. 14, 2005

(51) Int. Cl.
*H04L 12/28* (2006.01)

(52) U.S. Cl. ............................................ 370/389

(58) Field of Classification Search .......... 370/389, 370/465, 390, 410, 466, 467, 473, 476, 477, 370/395.42, 395.41, 299, 352, 386, 475; 709/230, 236

See application file for complete search history.

(56) References Cited

U.S. PATENT DOCUMENTS 7,355,971 B2 *    4/2008    Jason, Jr. .................... 370/231

FOREIGN PATENT DOCUMENTS

WO    WO 99/26448    *    5/1999

* cited by examiner

*Primary Examiner*—Chi H Pham
*Assistant Examiner*—Alexander Boakye
(74) *Attorney, Agent, or Firm*—Fogg & Powers LLC

(57) ABSTRACT

A method for automatically adapting to statically varying packet size is provided. The method includes receiving a stream of bytes over a physical medium. A packet size is determined from the bytes in the stream of bytes. Further, the determined packet size is used to process packets from the received byte stream.

27 Claims, 4 Drawing Sheets

AUTO-ADAPTATION TO PACKET SIZE ON A PHYSICAL MEDIUM

TECHNICAL FIELD

The present invention relates generally to the field of telecommunications, and, in particular, to auto-adaptation to packet size on a physical medium.

BACKGROUND

Telecommunications networks use a variety of technologies to transmit signals between subscribers. These technologies include both analog and digital communications. One digital technology used to communicate signals in telecommunications networks is referred to as asynchronous transfer mode (ATM). ATM technology is a packet-based technology that transports data as payload in packets known as cells.

Typically, ATM packets or cells are 53 bytes long, including overhead and payload. When user data exceeds the payload capacity of an ATM cell, the user data is divided into smaller portions and transported using multiple cells as is known in the art.

A typical communication network includes a physical medium, e.g., copper wire, optical cable, wireless medium, or other appropriate physical medium, for transporting cells between ATM equipment. Conventionally, a transmission convergence (TC) layer is used to make the transition between the ATM-based equipment and the physical medium. For example, when receiving cells, the TC layer conventionally looks for a cell boundary and then counts a selected number of bytes (typically 53) and tests for another cell boundary. The TC layer then converts the received bytes into a cell for use by the ATM-based equipment.

In some systems using ATM cells, it is desirable to transport additional information between ATM equipment connected over a physical link. This additional information is sometimes referred to as "out-of-band" information. It is desirable to be able to carry this information between the ATM-based equipment within the ATM cells. This out-of-band information is typically information that is not provided for in the standard ATM cell. Further, the size of such out-of-band data may change from time to time. Unfortunately, a conventional TC layer is designed for a specific, usually standard, cell size. Thus, if an ATM product is updated to include the use of additional out-of-band information, the TC layer typically has to be redesigned to account for the new out-of-band information to be passed over the physical medium.

Therefore, there is a need in the art for reducing the complexities associated with changing the size of packets in a packet-based communication system.

SUMMARY

Embodiments of the present invention solve the problem above by providing a transmission convergence layer that detects changes in cell size and automatically adjusts to the statically varying size of packets or cells received on the physical medium. Advantageously, this allows for faster and less complicated field upgrades that change the amount of out-of-band signaling associated with non-standard cell sizes.

In one embodiment, a method for automatically adapting to statically varying packet size is provided. The method includes receiving a stream of bytes over a physical medium. A packet size is determined from the bytes in the stream of bytes. Further, the determined packet size is used to process packets from the received byte stream.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention allow packet-based communications systems, such as asynchronous transfer mode (ATM) systems, to adapt to changes in the size of packets that pass through the system without requiring manual modification or reprogramming of the transmission convergence (TC) layer. Advantageously, the TC layer of these embodiments automatically adapts to packets of any appropriate size without prior knowledge of packet size. Once the TC layer adapts to the current packet size, the TC layer is able to interface between packet-based equipment and the physical layer.

The TC layer adapts to changes from one fixed, static packet size to another fixed, static packet size when, for example, changes in the system are implemented. Such a change in packet size could be the result of a field upgrade to equipment. The TC layer detects the change and learns the new packet size. Once learned, the TC layer is able to act as an interface between the packet-based equipment and the physical layer.

In these embodiments, the packet size is said to be "statically varying" because the size of the packets is able to change ("varying") but stays the same ("statically") for a long enough time for useful information to be transmitted over the system. In this way, system upgrades that introduce or change out of band signaling are accomplished without any changes or modifications to the TC layer.

For purposes of this specification, the term packet is used to refer to a block of data that is transmitted as a unit in a communication system. Although the embodiments described below relate to ATM systems, the term packet as used in this specification is not limited to ATM cells. The term includes other appropriate existing or later-developed packet-based technologies.

Figure 1:
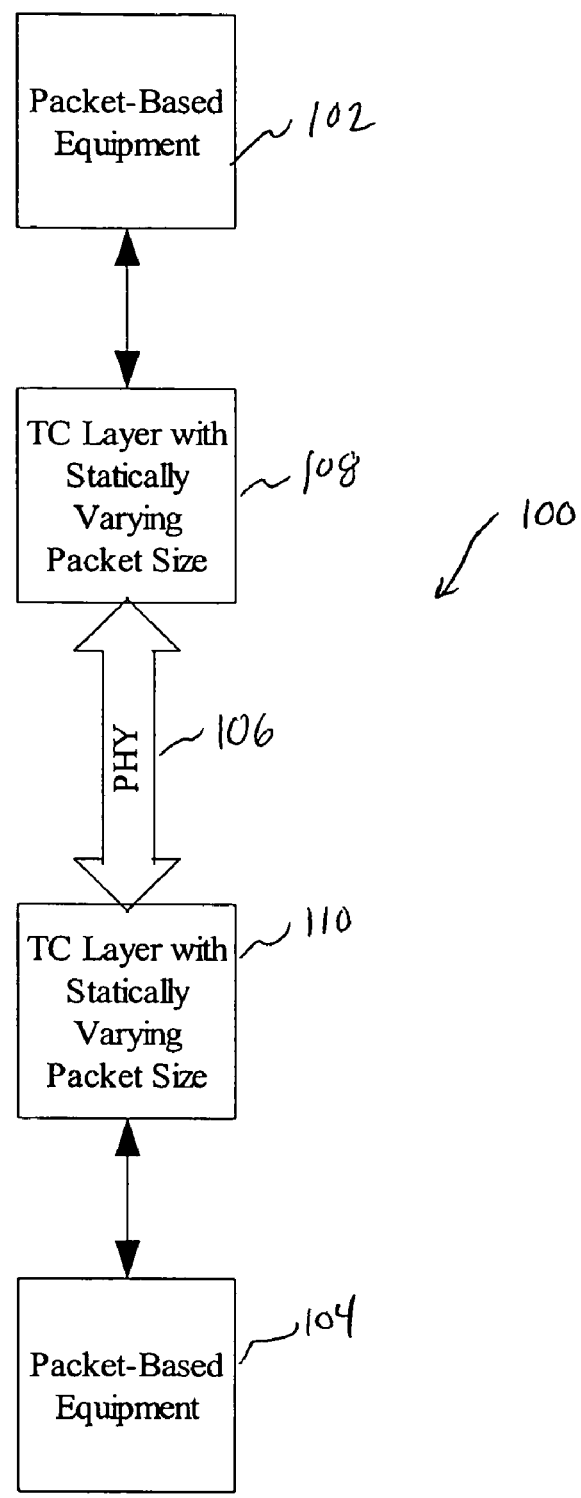
FIG. 1 is a block diagram of a packet-based communication system with a transmission convergence layer that automatically adjusts to static changes in the size of the packets.

FIG. 1 is a block diagram of an embodiment of a system, indicated generally at 100, with automatic adaptation to packet size in transmission convergence layers 108 and 110 according to the teachings of the present invention. Advantageously, system 100 automatically adapts to static changes in packet size to allow transmission of packets of varying size to be transmitted over a physical medium without requiring time consuming modification of the transmission convergence (TC) layer.

System 100 allows for communication between packet-based equipment, e.g., packet-based equipment 102 and 104, over a physical medium 106. In one embodiment, packet-based equipment 102 and 104 each comprise ATM-based communication equipment. Physical medium 106 comprises any one of copper wire, fiber optic cable, wireless medium or other appropriate physical medium for transmitting signals between packet-based equipment. Transmission convergence layers 108 and 110 provide the interface between packet-based equipment 102, 104, respectively, and physical medium 106.

In operation, system 100 transports packets of statically varying size between packet-based equipment 102 and 104 over physical medium 106. Transmission convergence layers 108 and 110 adapt to the size of packets received over physical medium 106. This adaptation is done on a static basis. In one embodiment, the TC layers 108 and 110 look for a specified number of packets in a row with the same size, e.g., the same number of bytes. When detected, the TC layer enters a synchronous state and uses the identified packet size in processing further packets. During the synchronous state, the TC layers monitor packets for changes in the packet size. When enough packets of a different size are received, the TC layer exits the synchronous state and attempts to resynchronize to a new, static packet size.

Figure 2:
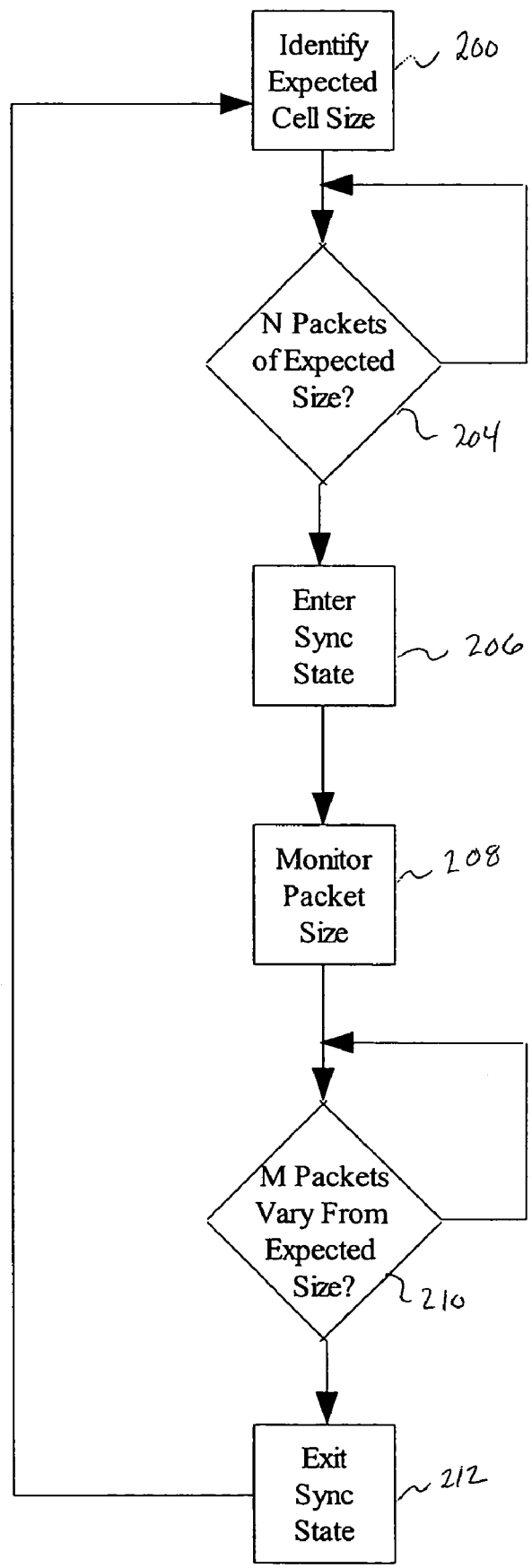
FIG. 2 is a flow chart of a process for automatically adapting the size of packets in a transmission convergence layer.

To illustrate the process for adapting to a new cell size, an example is given with respect to TC layer 108 using a process shown in FIG. 2. TC layer 108 receives a stream of bytes over physical medium 106. This stream of bytes includes packets of a static, unknown size. First, TC layer 108 identifies an expected packet size at block 200. In one embodiment, TC layer 108 determines the packet size by identifying two consecutive cell boundaries in a stream of ATM data packets. In one embodiment, the cell boundaries are identified by calculating a header error check (HEC) code on a consecutive number of bytes and comparing the value with a subsequent byte in the data stream. When the calculated HEC value is the same as the subsequent byte in the data stream, a boundary may have been identified. The separation of two cell boundaries establishes a potential cell size.

Next, at block 204, the method proceeds to identify N additional packets of the same size using the calculated, expected packet size. In one embodiment, the method looks for eight additional cell boundaries that correspond to eight ATM cells of the expected size. When the N consecutive packets match the expected packet size identified above, the method enters a synchronous or sync state at block 206 in which the TC layer is synchronized to the correct packet size for the stream of data transmitted over the physical medium 106. At this point, the method proceeds to process additional bytes in the data stream.

The method further determines when the TC layer receives enough packets of the wrong size so that synchronization of the TC layer with the correct packet size is lost. At block 208, the method monitors the size of packets in the data stream during the synchronous state. When the size of M packets received in the synchronous state varies from the expected packet size as determined at block 210, the TC layer 108 exits the synchronous state at block 212. The TC layer further returns to block 200 to re-synchronize to the packet size being received over the physical medium.

Figure 3:
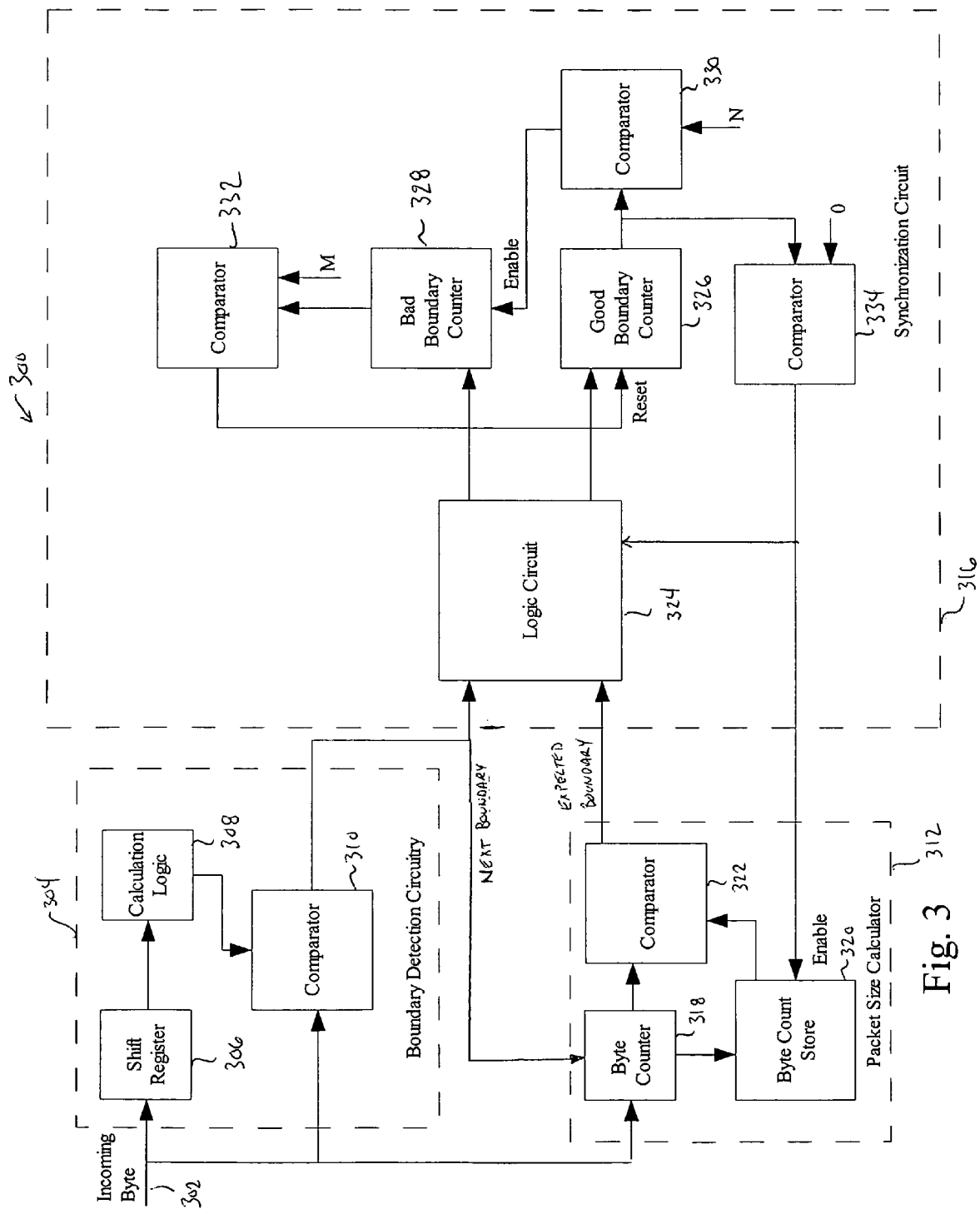
FIG. 3 is a block diagram of an embodiment of a circuit for a transmission convergence layer that automatically adapts to a static change in the packet size of a communication system.

FIG. 3 is a block diagram of an embodiment of a circuit, indicated generally at 300, for a transmission convergence layer that automatically adapts to a static change in the packet size of a communication system. Circuit 300 adapts the operation of the transmission convergence layer to the size of packets in a data stream received at input 302. Circuit 300 includes three main components: boundary detection circuitry 304, packet size calculator 312, and synchronization circuit 316. Each of these components is described in detail below.

Boundary detection circuitry 304 continuously monitors the data stream at input 302 to identify possible boundaries between consecutive packets. Boundary detection circuitry 304 includes shift register 306, calculation logic 308, and comparator 310. Shift register 306 is coupled to receive the incoming data stream. In one embodiment, shift register 306 is sized to receive a number of bytes equal to the number of bytes in the header of the packets. For example, in an embodiment using ATM cells, shift register 306 is a four byte shift register corresponding to the four bytes of the ATM cell header excluding the header error check code (HEC) byte. Calculation logic 308 is coupled to shift register 306. Calculation logic 308 performs a calculation on the data stored in shift register 306 to identify a cell boundary. In one embodiment, calculation logic 308 comprises circuitry that calculates a HEC code based on four bytes of the incoming data stream stored in shift register 306. Further, comparator 310 is coupled to the output of calculation logic 308 and the incoming data stream input 302. Comparator 310 compares the output of calculation logic 308 with the next byte in the data stream. When the two values provided to comparator 310 are equal, the boundary detection circuitry 304 has identified a boundary since the calculated HEC value from calculation logic 308 equals the received HEC value (the byte following the four bytes stored in the shift register 306.) The comparator 310 provides a logic output signal, labeled "NEXT BOUNDARY," indicating whether a boundary between two packets has been identified. When the output of logic 308 is equal to the next value in the data stream, the boundary detection circuit provides a logic high output indicating that a boundary has been identified. The boundary detection circuitry 304 constantly monitors the incoming data stream to identify possible boundaries between packets.

Packet size calculator 312 determines the size of the packets for the TC layer based on two consecutive boundaries identified by boundary detection circuitry 304. Packet size calculator 312 includes byte counter 318. Byte counter 318 is incremented with each byte of data received at input 302. Thus, byte counter 318 identifies the number of bytes received since the last boundary was identified. When the next boundary is identified, the value in byte counter 318 indicates the number of bytes in the current packet. The value in byte counter 318 is reset with each identified boundary. Further, packet size calculator 312 includes byte count store 320, e.g., a register. Byte count store 320 is loaded with the value in byte counter 318 after the first two consecutive packet boundaries are identified.

This value stored in byte count store 320 is used by synchronization circuit 316 to determine whether subsequent boundaries detected by boundary detection circuitry 304 occur with the expected interval. Packet size calculator 312 also includes comparator 322. Comparator 322 compares the value in byte count store 320 (the expected cell size) with the value in byte counter 318 (the number of bytes since the last boundary). Comparator 322 provides a signal "EXPECTED BOUNDARY" to synchronization circuit 316 that indicates that a boundary is expected. If the two values received at comparator 322 are equal, the EXPECTED BOUNDARY signal is a high logic level. Otherwise, EXPECTED BOUNDARY is a low logic value.

Synchronization circuit 316 is the final component of circuit 300. Synchronization circuit 316 includes a logic circuit 324 that is coupled to receive both the NEXT BOUNDARY signal from boundary detection circuitry 304 and the EXPECTED BOUNDARY signal from packet size calculator 312. Logic circuit 324 provides output signals to two counters: good boundary counter 326 and bad boundary counter 328. Good boundary counter 326 is used to count the number of consecutive good packet boundaries that are identified once the packet size is determined by packet size calculator 312. A good packet boundary corresponds to the NEXT BOUNDARY and EXPECTED BOUNDARY signals simultaneously providing high logic levels to logic circuit 324. The value in good boundary counter 326 is provided to comparator 330. Comparator 330 also receives an input indicating the number, N, of consecutive packet boundaries required to enter into a synchronous state. When good boundary counter 326 indicates that N consecutive boundaries have lined up with expectations, synchronization circuit 316 enters the synchronous state and the good boundary counter 326 ceases to increment.

Once in the synchronous state, synchronization circuit 316 monitors further data in the data stream to determine if synchronization is lost, e.g., to determine when the packet size is changed. Synchronization circuit 316 uses bad boundary counter 328 to determine loss of synchronization. When entering the synchronous state, comparator 330 enables bad boundary counter 328. Bad boundary counter 328 counts the times that a cell boundary did not occur with the expected interval. This is determined based on the signals NEXT BOUNDARY and EXPECTED BOUNDARY not indicating a boundary the expected number of bytes after the last boundary was found. Bad boundary counter is enabled to increment only at the time of the expected boundary. Bad boundary counter 328 provides the number of consecutive missed boundaries to comparator 332. When M consecutive boundaries are missed, the comparator 332 resets good boundary counter 326. This places circuit 300 back into an unsynchronized state. In this state, comparator 334 provides a signal to byte count store 320 to allow a new value to be stored so that the circuit 300 can synchronize to a new packet size.

In operation, circuit 300 synchronizes to a packet size for a communication link with a statically varying packet size. Boundary detection circuitry 304 monitors a stream of packets to identify boundaries between packets. When in an unsynchronized state, packet size calculator 312 determines the expected size of the packets based on two initial boundaries identified by boundary detection circuitry 304. Once the expected size is determined, synchronization circuit 316 counts the number of boundaries that match the expected interval between boundaries using good boundary counter 326. When this count reaches a defined level, N, e.g., 8 boundaries, the synchronization circuit 316 enters a synchronized state in which the static size of the cells is known. In this state, the synchronization circuit monitors the boundaries between cells. When a cell boundary does not occur at the expected time, a bad boundary counter 328 is incremented. If M sequential, e.g., 7, packet boundaries fail to occur at the right time, the synchronization circuit 316 goes out of its synchronized state. This allows the packet size calculator to recalculate the size of packets since the size may have changed due to a system upgrade. Once calculated, the process of synchronizing proceeds again as described above.

Figure 4:
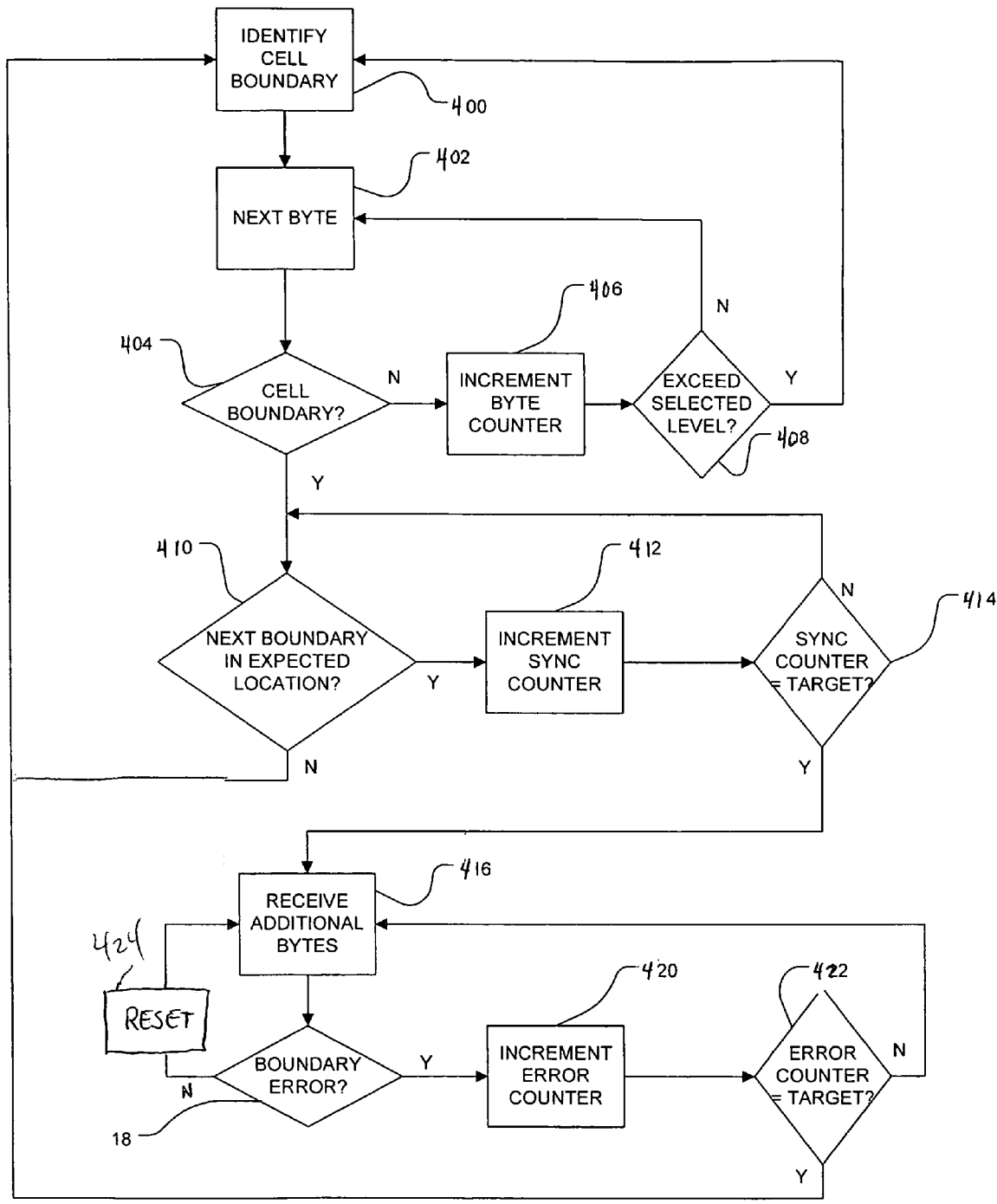
FIG. 4 is a flow chart of another process for automatically adapting the size of packets in a transmission convergence layer.

FIG. 4 is a flow chart of another process for automatically adapting the size of cells in a transmission convergence layer according to the teachings of the present invention. The process begins at block 400 and identifies a first cell boundary. In one embodiment, the process calculates a header error check (HEC) value based on a number of consecutive bytes received in a stream of packets. The process further compares the calculated HEC value with the next byte of the data stream to determine whether a cell boundary has been identified. Essentially, this process identifies the boundary because the bytes used to calculate the HEC value and the byte that matched the calculated HEC value are determined to be a header of a packet.

The method proceeds to identify the next cell boundary. At block 402, the process receives the next byte. At block 404 the process determines whether the byte occurs at a cell boundary. Again, the HEC value is used in one embodiment to identify the cell boundary. If the byte does not correspond to a boundary, then the process proceeds to block 406 and increments a byte counter. The byte counter is used to determine the cell size. Through this loop, each time a byte is received that is not the next boundary, this counter is incremented. Thus, when the next boundary is identified, the counter reflects a value related to the size of the cells or packets being received over the physical medium.

Block 408 limits the allowable cell size to a practical level. For example, cell size can be limited to less than 65 bytes. This provides up to 13 bytes for transmission of out-of-band information. At block 408, the process determines whether the byte counter has exceeded a selected level. If so, the process returns to block 400 and restarts the process for determining the cell size by looking for the next boundary. If the selected level has not been exceeded, the process returns to block 402 and receives the next byte. By limiting the cell size to a selected level, the process is able to restart more quickly if a boundary is missed at block 404.

At block 410, the process begins to verify the identified cell size. The process first determines whether the next boundary occurs at the expected location. If so, the process increments a sync counter. At block 414, the process determines whether the sync counter has reached a target level. If not, then the process returns to block 410 to identify the next expected boundary location. At block 410, if the process determines that a boundary did not occur at the expected location in the data stream, the process returns to block 400. Once the target number of consecutive boundaries (e.g., cells) has been successfully received, e.g., all cells of the same, expected size, the method proceeds to block 416 to process cells received over the physical layer. During this processing, the TC layer is declared to be in a sync state. Thus, cells are expected to be of the size identified by the process. If, however, any cells violate this expectation, corrective action may need to be taken.

At block 418, the method determines if there has been a boundary error, e.g., a boundary did not occur at the point expected based on the derived packet size. If there has been a boundary error, e.g., a cell of a different size than expected, the method proceeds to block 420 and increments an error counter. At block 422 the process determines whether the error counter has reached a target level. If so, the method restarts the process of identifying the cell size. If not, the method returns to block 416 to receive and process additional bytes using the same identified cell size. If at block 418, the process determines that the there was no boundary error, the method proceeds to reset the error counter at block 424 and returns to block 416 and processes additional bytes.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions stored on a machine readable medium to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices or machine readable medium suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A communication system, comprising:
    a first packet-based communication device;
    a second packet-based communication device;
    a physical medium, coupled between the first and second packet-based communication devices; and
    a first transmission convergence layer associated with the first packet-based communication device and a second transmission convergence layer associated with the second packet-based communication device, the first and second transmission convergence layers configured to automatically adapt to a statically varying packet size based on packets received at the respective first and second packet-based communication devices.

2. The communication system of claim 1, wherein the first and second transmission convergence layers each include a machine readable medium having stored thereon for a method for automatically adapting to a statically varying packet size comprising:
    receiving a stream of bytes from the physical medium;
    identifying an expected packet size based on the received bytes;
    counting N additional packets that match the expected packet size;
    entering a sync state based on receiving the N additional packets;
    monitoring packet size of packets received in the sync state; and
    when M packets vary from the expected packet size, exiting the sync state.

3. The communication system of claim 2, wherein the N additional packets comprise N consecutive packets.

4. The communication system of claim 2, wherein the M packets comprise M consecutive packets.

5. The communication system of claim 2, wherein identifying an expected packet size comprises identifying an expected packet size from consecutive packet boundaries.

6. The communication system of claim 5, wherein identifying packet boundaries comprises calculating header error check values and comparing the calculated values with a byte of data in the stream of bytes.

7. A computer readable medium encoded with computer interpretable instructions for a method for automatically adapting to a statically varying packet size, the method comprising:
    receiving a stream of bytes from the physical medium;
    identifying an expected packet size based on the received bytes;
    counting N additional packets that match the expected packet size;
    entering a sync state based on receiving the N additional packets;
    monitoring packet size of packets received in the sync state; and
    when M packets vary from the expected packet size, exiting the sync state.

8. The computer readable medium of claim 7, wherein the N additional packets comprise N consecutive packets.

9. The computer readable medium of claim 7, wherein the M packets comprise M consecutive packets.

10. The computer readable medium of claim 7, wherein identifying an expected packet size comprises identifying an expected packet size from consecutive packet boundaries.

11. The computer readable medium of claim 10, wherein identifying packet boundaries comprises calculating header error check values and comparing the calculated values with a byte of data in the stream of bytes.

12. A computer readable medium encoded with computer instructions stored thereon for a method for automatically adapting to statically varying packet size, the method comprising:
    receiving a stream of bytes over a physical medium;
    determining a static packet size from the bytes in the stream of bytes;
    using the determined packet size to process packets from the received byte stream; and
    re-determining the packet size after a selected number of errors in the processing of packets.

13. The computer readable medium of claim 12, wherein determining a packet size comprises identifying first and second boundaries of a packet based on bytes in the received stream of bytes.

14. The computer readable medium of claim 13, wherein determining a packet size further comprises counting a number of bytes in the byte stream between the first and second boundaries.

15. The computer_readable medium of claim 13, wherein determining a packet size further comprises identifying N additional boundaries separated by the same number of bytes.

16. A computer readable medium encoded with interpretable instructions for a method for automatically adapting to statically varying packet size, the method comprising:
    identifying a first boundary;
    identifying a second boundary;
    determining the statically varying packet size based on the first and second boundaries;

identifying an additional N boundaries based on the determined packet size; and entering a sync state based on the identification of the additional N boundaries.

17. The computer readable medium of claim 16, wherein identifying the first boundary comprises calculating a header error check (HEC) value and comparing with a received value.

18. The computer readable medium of claim 16, wherein determining the statically varying packet size comprises counting the number of bytes between the first and second boundaries.

19. The computer readable medium of claim 18, and further comprising limiting the counting of bytes after the first boundary to a selected number of bytes.

20. The computer readable medium of claim 16, wherein identifying an additional N boundaries comprises identifying an additional N boundaries based on a calculated header error check (HEC) value.

21. The computer readable medium of claim 16, and further comprising returning to the identifying of a first boundary to resynchronize when a selected number of boundary errors are detected following entering the sync state.

22. The computer readable medium of claim 16, wherein identifying an additional N boundaries comprises identifying additional boundaries based on the determined statically varying packet size.

23. A circuit for automatically adapting to a statically varying packet size, the circuit comprising:

a boundary detection circuit that receives a stream of bytes, the boundary detection circuit adapted to detect a boundary between consecutive packets based on the stream of bytes, and to generate a signal indicating the next boundary;

a packet size calculator, responsive to the stream of bytes, the packet size calculator adapted to calculate and store an expected packet size based on the received bytes and to generate a signal indicating the expected next packet boundary; and a synchronization circuit, responsive to the signal indicating the next boundary and the signal indicating the expected next boundary, that is adapted to count N consecutive valid boundaries to enter a sync state and to count M consecutive missed boundaries to exit the sync state.

24. The circuit of claim 23, wherein the boundary detection circuit includes:

a shift register that receives and stores X consecutive bytes of data in the data stream;

a calculation circuit, responsive to the data in the shift register, the calculation circuit operative to calculate a header error check (HEC) code based on the data in the shift register; and a comparator, responsive to the received data bytes and the calculation circuit, that is operative to compare the next data byte with the calculated HEC code to identify a boundary between packets.

25. The circuit of claim 23, wherein the boundary detection circuit uses a calculation of the header error check code to detect boundaries between packets.

26. The circuit of claim 23, wherein the packet size calculator comprises:

a byte counter, responsive to the received stream of data bytes, the byte counter adapted to count the number of bytes between packet boundaries;

a byte count store, responsive to the byte counter, that is adapted to hold a value of the byte counter after two consecutive boundaries are identified; and a comparator, responsive to the byte counter and the byte count store, that is adapted to compare the next byte count with the held value so as to produce the signal indicating expected next packet boundary.

27. The circuit of claim 23, wherein the synchronization circuit comprises:

a logic circuit, responsive to the signal indicating the next boundary of the boundary detection circuit and the signal indicating the expected next packet boundary of the packet size calculator;

a good boundary counter, responsive to an output of the logic circuit, that is adapted to count the number of times the expected and actual packet boundaries coincide;

a comparator, responsive to the good boundary counter, that is adapted to place the synchronization circuit in a sync state when the good boundary counter indicates that N boundaries have matched the expected boundaries;

a bad boundary counter, responsive to an output of the logic circuit, that is adapted to count the number of times the expected and actual packet boundaries do not coincide after entering the sync state; and a comparator, responsive to the bad boundary counter, that is adapted to place the synchronization circuit in an unsynchronized state when the bad boundary counter indicates M boundaries did not match the expected boundaries.

* * * * *